(No Model.) 3 Sheets—Sheet 1.
G. O. BRAGER.
CASH REGISTER, INDICATOR, AND ADDING MACHINE.
No. 583,192. Patented May 25, 1897.

Witnesses
Jas. S. McLathran
T. F. Riley

Inventor
Guul O. Brager
By his Attorneys,
C. A. Snow & Co.

THE NORRIS PETERS CO., PHOTO-LITHO., WASHINGTON, D. C.

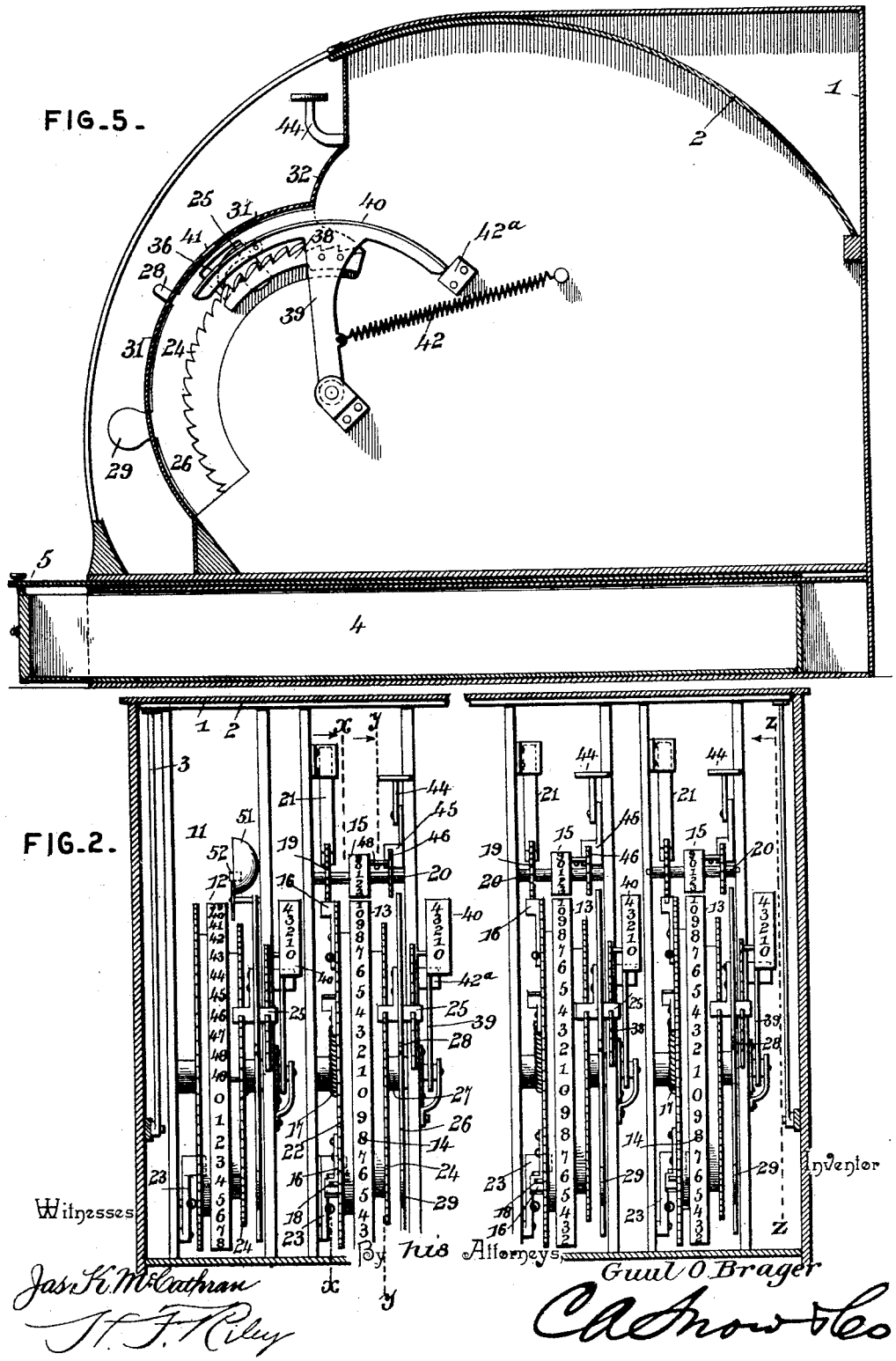

(No Model.) 3 Sheets—Sheet 3.
G. O. BRAGER.
CASH REGISTER, INDICATOR, AND ADDING MACHINE.
No. 583,192. Patented May 25, 1897.

Witnesses
Jas. K. McCathran
H. F. Riley

Inventor
By his Attorneys, Gruul O. Brager
C. A. Snow & Co.

UNITED STATES PATENT OFFICE.

GUUL O. BRAGER, OF OSAGE, IOWA.

CASH REGISTER, INDICATOR, AND ADDING-MACHINE.

SPECIFICATION forming part of Letters Patent No. 583,192, dated May 25, 1897.

Application filed November 21, 1895. Serial No. 569,709. (No model.)

*To all whom it may concern:*

Be it known that I, GUUL O. BRAGER, a citizen of the United States, residing at Osage, in the county of Mitchell and State of Iowa, have invented a new and useful Cash Register, Indicator, and Adding-Machine, of which the following is a specification.

The invention relates to improvements in cash registers, indicators, and adding-machines.

The object of the present invention is to improve the construction of cash registers, indicators, and adding-machines and to provide an apparatus which will be capable of registering and accurately adding sales or other sums and adapted to indicate the total amount registered and also the sum last added in order to enable an operator adding a sum of figures to leave the apparatus at any time and on his return to ascertain instantly the amount last added, so that he will know where he left off, so that all mistakes and inconveniences resulting from a lack or uncertainty of such knowledge will be obviated.

The invention consists in the construction and novel combination and arrangement of parts hereinafter fully described, illustrated in the accompanying drawings, and pointed out in the claims hereto appended.

Figure 1:
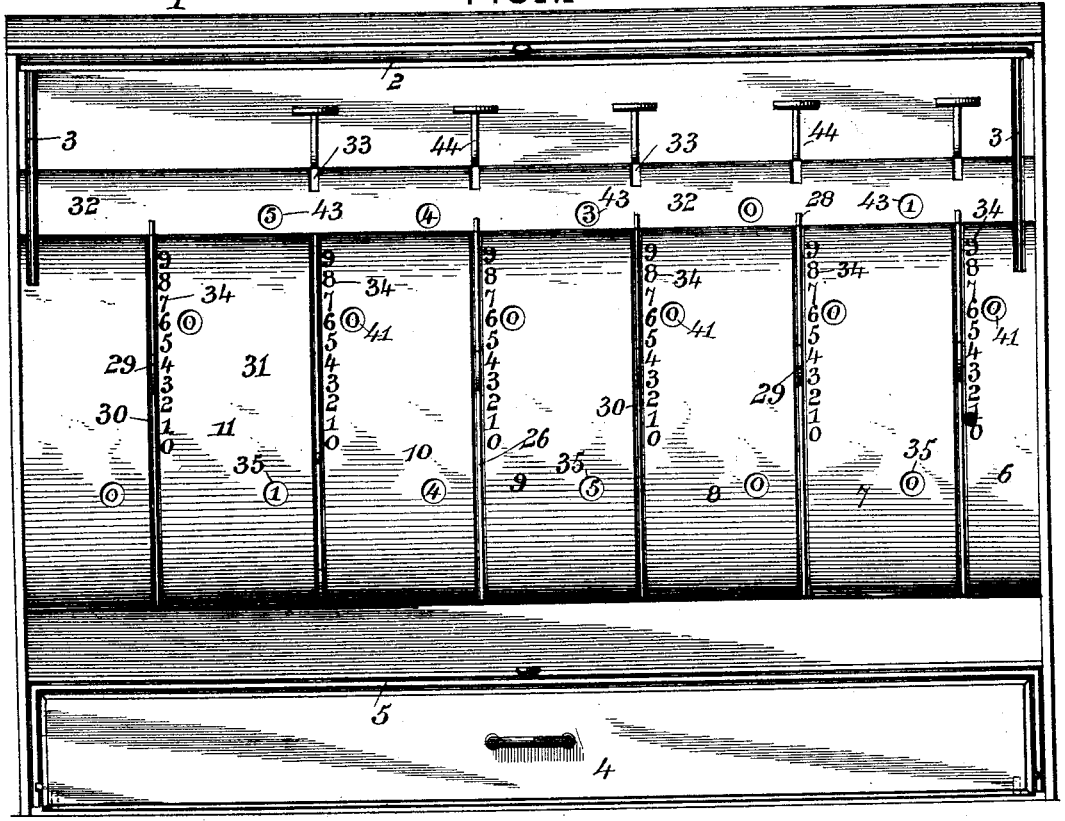
Figure 6:
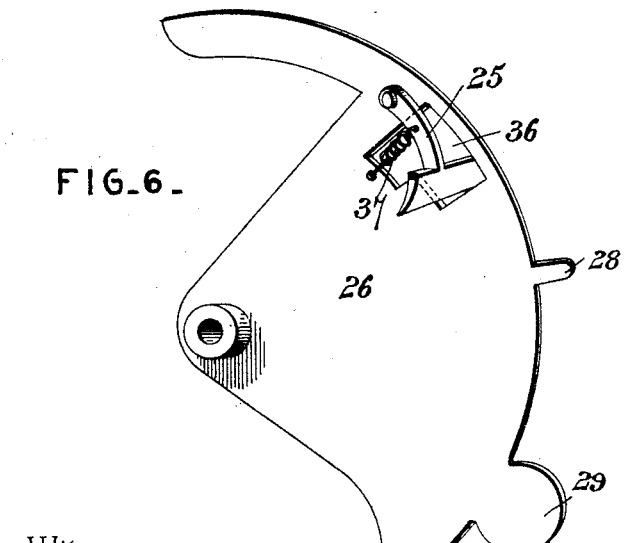
Figure 7:
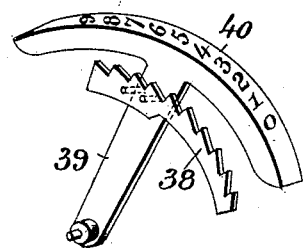
Figure 3:
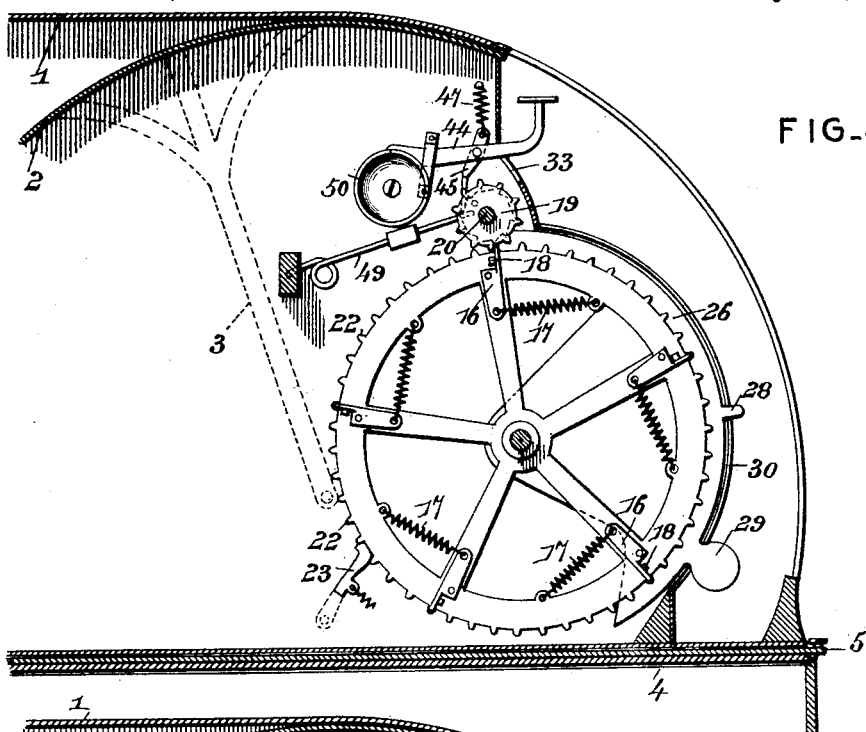
Figure 4:
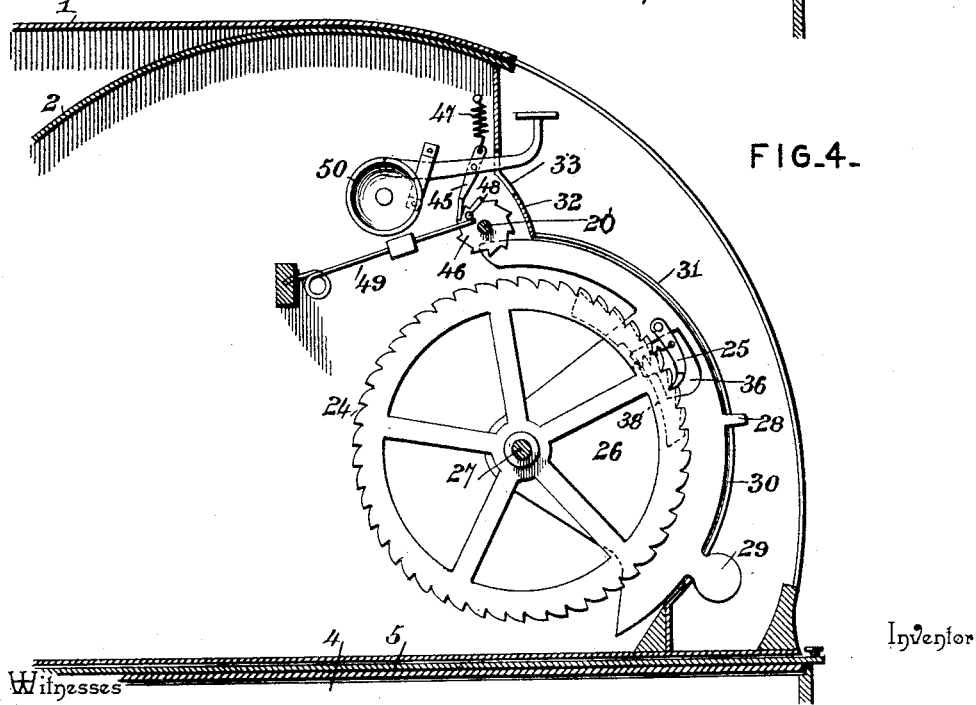

In the drawings, Figure 1 is a front elevation of a cash register, indicator, and adding-machine constructed in accordance with this invention, the cover being raised. Fig. 2 is a transverse sectional view, the mechanism being shown in elevation. Fig. 3 is a vertical sectional view on line X X of Fig. 2. Fig. 4 is a similar view on line Y Y of Fig. 2. Fig. 5 is a vertical sectional view on line Z Z of Fig. 2. Fig. 6 is a detail view of the radially-arranged operating lever or arm. Fig. 7 is a similar view of the radially-arranged temporary indicator.

Like numerals of reference indicate corresponding parts in all the figures of the drawings.

1 designates a casing constructed of any suitable material and provided with a curved front, which is closed, when the apparatus is not in use, by a curved cover 2, provided at opposite sides of the casing with radially-disposed arms 3, which are pivoted to the casing and which permit the curved cover to spring upward and downward to open and close the casing. This curved cover is designed to be provided with any suitable locking device to prevent access to the registering and indicating mechanism when desired. At the bottom of the casing is arranged a cash-drawer 4, which is designed to be provided with a suitable combination-lock or other fastening device, and above the cash-drawer is located a desk 5, comprising a horizontal top and vertical sides 5ᵃ and forming a rectangular housing for the cash-drawer 4. The sides 5ᵃ of the desk slide on the bottom of the casing, and they are provided at their inner faces with horizontal grooves, forming ways and receiving strips 4ᵃ of the drawer, whereby the latter is mounted within the desk and is adapted to be drawn outward with the desk and to slide independently thereof. By this construction the desk and the drawer are adapted to be drawn outward together or independently of each other.

Within the upper portion of the casing are mounted six separate and independent sets of registering and indicating mechanism. The sets 6, 7, 8, 9, and 10 are identically the same in construction, and a description of one set will suffice for all. The other and last set 11 of registering and indicating mechanism differs from the other sets in that the temporary indicator, hereinafter described, is omitted and only one numeral-bearing disk 12 is employed, and this disk bears consecutively-arranged numerals ranging from "0" to "49." Each of the sets 6, 7, 8, 9, and 10 is provided with a main numeral-bearing disk 13, having on its periphery numerals 14, arranged in series from "0" to "9," five series being preferably provided. This main numeral-bearing disk 13 actuates a smaller auxiliary registering-disk 15, which is provided on its periphery with a series of numerals ranging from "0" to "9." The disks 13 and 15 are mounted on suitable shafts, and disk 13 is provided at one of its faces with a series of dogs 16, arranged at intervals and located at the ends of the series of numerals 14, and adapted, each time the main numeral-bearing disk is rotated from "0" to "9," to actuate the registering-disk 15 the distance of one tooth, and as the main disk is provided with five dogs 16 and the registering-disk has ten teeth, it will be seen that it is necessary for the main registering-disk 13 to make two complete revolutions in order to actuate the registering-disk 15 one revolution. The main registering-disk 13 is a cent-disk, and after it has been rotated sufficiently to actuate the disk 15 one revolution the sum of one dollar or one hundred cents will have been registered on said disk 15, which might be called a "dime-disk."

The dogs 16 are pivoted intermediate of their ends to the face of the disk and are connected at their inner ends with springs 17, and their outer ends, which form teeth, bear against stops 18, whereby they present rigid teeth to a cog-wheel 19 in actuating the registering-disk 15, but are adapted to permit the registering-disk 15 and the cog-wheel 19 to rotate freely when actuated independently of the main numeral-bearing disk 13. The cog-wheel 19, as illustrated in the accompanying drawings, is fixed to the shaft 20; but it will be readily apparent that the cogs may form a portion of the disk 15 and be arranged at the periphery thereof, if desired. The registering-disk 15 is held against retrograde rotation by a resilient check-pawl 21, engaging the cog-wheel 19.

At one side of the main numeral-bearing disk 13 is arranged a series of teeth 22, which are engaged by a spring-actuated check-pawl 23 to lock the disk 13 against retrograde rotation, and at the other side of the said disk 13 are located an annular series of ratchet-teeth 24, which are engaged by a spring-controlled actuating-pawl 25 of a radially-arranged operating lever or arm 26. The operating lever or arm 26 is substantially quadrant-shaped, and is mounted loosely on the shaft 27 of the main numeral-bearing disk 13, and it is provided at its curved edge or periphery with an indicating finger or pointer 28 and a handle 29, both operating in a slot 30 of a curved face-plate 31, arranged concentric with the disk 13 and located at the front of the casing and concealing the said disk 13 and the adjacent mechanism. The plate 31 is provided with an upward extension 32, which conceals the registering-disk 15 and the adjacent mechanism, and suitable slots are provided in the face-plate to permit the necessary movement of the arms 3 of the curved cover, as clearly illustrated in Fig. 1 of the accompanying drawings.

Adjacent to the slot 30 of the face-plate is arranged a series of numerals 34, ranging upward from "0" to "9," the indicating-finger being normally at "0" and being adapted to be swung upward opposite the proper numeral, according to the distance the disk 13 is to be rotated. The series of numbers 34 form a guide or index to enable the operator to rotate accurately the disk the distance of any number of teeth from "1" to "9." The numerals of the disk 13 are successively exposed through an aperture 35 of the face-plate 31.

The spring-controlled pawl 25 is pivotally mounted on the arm or lever 26, adjacent to an opening 36, and it is provided with a transverse tooth, which is held in engagement with the teeth 24 by a spring 37, and the transversely-disposed tooth on the pawl 25 extends laterally through the opening 36 and is adapted to engage a curved rack-bar 38 of a radially-arranged temporary indicator 39, bearing a series of numerals 40, which are exposed through an aperture 41 to indicate the amount or sum last added or registered. The temporary indicator 39 consists of an arm loosely journaled on the shaft 27 and an outer curved portion bearing the said numerals 40, which are a series ranging from "0" to "9" and which correspond with those adjacent to the slot 30 of the face-plate. A curved rack-bar is provided with nine teeth and is arranged concentric with the teeth 24, but terminates short of the same, whereby when the operating lever or arm is moved upward the pawl 25 in moving over the teeth 24 will automatically release the indicator 39. As soon as the indicator is released by the pawl 25 passing over the first tooth it is swung upward against a stop 42$^a$ to its initial position by a spring 42; but instead of employing a spring the indicator may be operated by extending it below the shaft 27 and weighting it. When the temporary indicator is in its initial position, the cipher of the series is exposed through the aperture 41, and as the operating lever or arm 26 is moved upward preparatory to actuating the disk 13 the teeth of the curved rack-bar 38 are engaged by the pawl 25 simultaneously with the teeth 24. By means of the temporary indicator the sum last registered and added is exposed through the openings 41 of the face-plate, so that when the apparatus is employed in banks and other establishments as an adding-machine an operator may temporarily leave the apparatus while in the act of adding up a column of figures, and when he returns he can instantly ascertain the item last added and there can be no mistake resulting from an uncertainty of the amount last added.

The auxiliary registering-disk 15 is adapted to be actuated independently of the main registering-disk 13 when it is desired to return the disk 15 to its initial position, with its cipher exposed through an aperture 43 of the face-plate to set the mechanism preparatory to adding. This result is accomplished by means of a pivoted key 44, adapted to be depressed and carry an actuating-pawl 45, arranged to engage a ratchet-wheel 46, which is fixed to the shaft 20; but the ratchet-wheel may be mounted on the disk 15 like the teeth 24 of the disk 13. The pivoted key 44 is held lifted by a spring 47, which also holds the actuating-pawl 45 in engagement with the ratchet-wheel.

The ratchet-wheel 46 carries a pin or stud 48, which is arranged to engage a resilient bell-hammer 49, whereby when the disk 15 makes a complete revolution a bell 50 will be sounded, showing that one dollar has been registered or one hundred has been added.

The main registering-disk 13 of the first set 6 of indicating mechanism represents units, that of the second set indicates tens of cents, that of the third set units of dollars, that of the fourth set tens of dollars, that of the fifth set hundreds of dollars, and that of the sixth and last set thousands of dollars. When the disk 15 of the first set of mechanism makes one complete revolution and one hundred or one dollar has been registered, the operator depresses the key 44 of the second set of mechanism, moving the disk 15 of the second set one tooth and transferring the one dollar from the first set of mechanism to the second set of the same. When the disk 15 of the second set of mechanism has made a complete revolution, the bell thereof is sounded and the operator depresses the key of the third set of mechanism, moving the disk 15 thereof one tooth and registering ten dollars, and this is repeated throughout the sets. Whenever the bell of one set rings, the key of the next higher set is depressed and the companion disk 15 is actuated one tooth.

The disk 12 of the sixth set of mechanism, instead of having five serials of numerals ranging from "0" to "9," like the disks of the other sets, it has one series of numerals ranging from "0" to "49," and the machine is adapted to register up to fifty thousand. This last set of mechanism is provided with an alarm-bell 51 and a resilient bell-hammer 52, arranged to be engaged by a pin or projection of the disk 12, whereby the bell is sounded when the disk 12 has made one revolution.

In the accompanying drawings six sets of mechanism are provided, but it will be readily understood that the number of sets may be increased to enable any numbers to be added, of whatever magnitude. The number of sets with which a cash register, indicator, and adding-machine will be provided will vary, according to the character of the business in which it is employed.

The machine may be reset at the end of each day, and the total amount is found by adding the numbers exposed through the apertures 35 and 43, reading the numbers from left to right in the usual manner. When the machine is employed as a cash-register, it may be temporarily employed as an adding-machine, and when it is desired to do this the amount registered by the machine may be taken down on a slip of paper and the machine quickly reset, and after the adding has been completed the parts may be readily arranged to indicate the amount previously taken down on the slip, returning the register to its previous condition.

It will be seen that the cash register, indicator, and adding-machine is exceedingly simple and inexpensive in construction, that it is positive and reliable in operation, and that besides being an accurate cash register and indicator it is especially adapted for use in banking and other establishments as an adding-machine, and that it will indicate the item last added, thereby permitting the operator while still adding a column of figures to leave the machine temporarily and to ascertain immediately on his return the item last added, so that he can continue the addition without liability of making a mistake through forgetfulness.

Changes in the form, proportion, and minor details of construction may be resorted to without departing from the principle or sacrificing any advantages of the invention.

What I claim is—

1. In a machine of the class described, the combination of a registering-disk provided with teeth, a temporary indicator located adjacent to the disk and having teeth, an operating-lever provided with a pawl arranged to engage the teeth of the disk and the temporary indicator simultaneously and adapted to be moved backward to release the temporary indicator automatically, and means for automatically returning the temporary indicator to its initial position when it has been released, substantially as and for the purpose described.

2. In a machine of the class described, the combination of a registering-disk provided with an annular series of teeth, a radially-arranged temporary indicator located adjacent to the disk and provided with a curved rack-bar, a radially-arranged operating arm or lever located adjacent to the disk and the temporary indicator and provided with a pawl engaging the teeth and the rack-bar and adapted to actuate both the disk and the temporary indicator when the operating arm or lever is moved forward, and means for automatically disengaging the pawl from the rack-bar when the operating arm or lever is moved backward, substantially as and for the purpose described.

3. In a machine of the class described, the combination of a registering-disk, an annular series of teeth connected therewith, a radially-arranged operating lever or arm provided with a pawl engaging said teeth, and a radially-arranged temporary indicator having a curved rack-bar arranged to be engaged by the said pawl, and having its teeth terminating short of the said teeth, whereby the temporary indicator is automatically released when the pawl is moved from one of the annular series of teeth, substantially as described.

4. In a machine of the class described, the combination of a registering-disk, an annular series of teeth connected therewith, a radially-arranged temporary indicator provided with a curved rack-bar having teeth terminating short of the annular series of teeth, a radially-arranged arm or lever interposed between the rack-bar and the annular series of teeth, and a spring-controlled pawl mounted on the arm or lever and provided with a transversely-disposed tooth projecting from opposite sides of the arm or lever and arranged to engage the said teeth, substantially as described.

5. In a machine of the class described, the combination of a registering-disk provided with an annular series of teeth, a radially-arranged operating lever or arm provided with a pawl engaging said teeth, a radially-arranged temporary indicator having a curved rack-bar arranged to be engaged by said pawl and having its teeth terminating short of the said teeth, whereby the temporary indicator is automatically released when the pawl is moved from one of the annular series of teeth to another, and a spring connected with the temporary indicator for returning the same to its initial position as soon as its rack-bar is released by the said pawl, substantially as described.

6. In a machine of the class described, the combination of a casing, a sliding desk mounted in suitable ways of the casing and comprising a horizontal top and vertical sides, the latter being provided at their inner faces with ways, and a sliding cash-drawer mounted in the ways of the sides of the desk and adapted to be drawn outward with or independently of the latter, substantially as described.

7. In a machine of the class described, the combination of a casing, a main registering-disk 13, an auxiliary registering-disk 15 connected with and actuated by the disk 13, a ratchet-wheel connected with the disk 13 and provided with a projection, a key provided with an actuating-pawl engaging the ratchet-wheel and adapted to rotate the disk 15, and a resilient bell-hammer arranged to be engaged by the said projection, whereby a bell is sounded at the end of each rotation of the disk 15, substantially as described.

In testimony that I claim the foregoing as my own I have hereto affixed my signature in the presence of two witnesses.

GUUL O. BRAGER.

Witnesses:
S. R. PELTON,
H. W. MURPHY.